United States Patent [19]
Guise et al.

[11] 3,898,197

[45] Aug. 5, 1975

[54] BLOCKED POLYISOCYANATE COMPOSITION FOR THE TREATMENT OF KERATINOUS MATERIALS

[75] Inventors: Geoffrey Bruce Guise, Highton; Mervyn Benjamin Jackson, West Brunswick, both of Australia

[73] Assignee: Commonwealth Scientific and Industrial Research Organization, Campbell, Australia

[22] Filed: Feb. 7, 1973

[21] Appl. No.: 330,404

[30] Foreign Application Priority Data
Feb. 18, 1972 Australia............................ 8010/72

[52] U.S. Cl............ 260/77.5 TB; 8/128 R; 8/128 A; 8/192; 8/DIG. 11; 117/141; 260/18 TN; 260/29.2 TN; 260/77.5 AN
[51] Int. Cl...................... C08g 22/32; C08g 51/24
[58] Field of Search .............. 260/77.5 TB, 29.2 TN

[56] References Cited
UNITED STATES PATENTS
| | | | |
|---|---|---|---|
| 2,746,988 | 5/1956 | Doser............................ | 260/77.5 TB |
| 3,438,940 | 4/1969 | Keberle et al............... | 260/29.2 TN |

FOREIGN PATENTS OR APPLICATIONS
| | | | |
|---|---|---|---|
| 1,519,859 | 4/1968 | France......................... | 260/77.5 TB |

*Primary Examiner*—H. S. Cockeram
*Attorney, Agent, or Firm*—Dennis P. Clarke; Harold L. Stowell

[57] ABSTRACT

A bisulphite addition product of a polyisocyanate and/or polyisothiocyanate prepolymer, said addition product having on an average at least two isocyanate-bisulphite or isothiocyanate-bisulphite adduct groups per molecule, having no free isocyanate or isothiocyanate groups, and being freely water-soluble; said prepolymer being derived from a polyisocyanate and/or polyisothiocyanate and a polyhydroxy compound.

13 Claims, No Drawings

BLOCKED POLYISOCYANATE COMPOSITION FOR THE TREATMENT OF KERATINOUS MATERIALS

BACKGROUND OF THE INVENTION

1. Field of the Invention

This invention relates to an improved composition and process for the treatment of textile materials composed wholly or partly of keratinous fibres.

In particular, this invention relates to the treatment of keratinous textile materials with aqueous solutions of the product of addition of bisulphite salts to polyisocyanates, in which free isocyanate groups are absent.

A polyisocyanate - bisulphite addition product is defined as having the structure (1) where R is an organic radical and $M^+$ is a cationic group, and n a number greater than 2. Such addition products can be considered as being formally derived by the reaction symbolised in equation (2). Structures such as (1) and reactions such as (2) are a well known part of the teachings of the art of organic chemistry (for example, cf, S. Petersen, Liebigs Annalen, 562, pp 205 et seq., 1949).

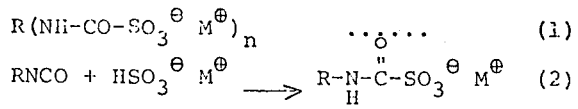

The object of such treatments is to impart more desirable properties to the keratinous materials and in particular improved shrinkage resistance. A further part of the present invention is to provide methods for the preparation of the novel polyisocyanate - bisulphite addition products for such treatments. Further objects and advantages of the invention will become evident from the following description.

When textile materials composed of untreated keratinous fibres, particularly wool, are washed and dried a reduction in the area known as shrinkage will almost inevitably occur.

2. Description of the Prior Art

A number of systems have been disclosed in the prior art to prevent shrinkage, cf., Wool Science Review No. 37, p. 37 and No. 36, p. 2 1969, but few of these have found widespread acceptance in the textile industry. The disadvantages of many of such methods of the prior art being, the difficulty and cost of application, or that the treatment is not sufficiently durable to last throughout the entire lifetime of the material, or that the degree of shrinkproofing imparted initially is not of a sufficiently high level.

The shrinkproofing methods of the prior art which suffer least from these disadvantages are those based on the use of isocyanate pre-polymers: for example such as disclosed in British Pat. Nos., 1,062,564, 1,161,748 1,064,982. Isocyanates are either capable of reacting with nucleophilic groups such as amino, hydroxyl and thiol which are commonly present in keratinous materials, or alternately the isocyanate groups can react with moisture to form amino groups which are then able to react with other isocyanates to give a polymer.

The ease that isocyanates react with water, even at room temperature, produces difficulties in the use of such pre-polymers on textile materials, in particular special precautions are required to prevent reaction with moisture on storage or immediately prior to application. It is usual to apply such pre-polymers to keratinous materials from anhydrous inert organic solvents such as chlorinated hydrocarbons or hydrocarbons to minimise such reaction with water. Such application from solvents requires the use of special application apparatus not commonly found in textile mills. Such isocyanate prepolymers are insoluble in water but can be applied to keratinous materials as aqueous emulsions. However due to reaction with water such emulsions are only stable for a few hours and thus most industrial application of such isocyanate pre-polymers has been from solvents.

In order to circumvent these difficulties due to hydrolysis of isocyanates there have been disclosed in the prior art a number of compositions for treating keratinous materials based on "blocked" isocyanates, for example, British Pat. Nos. 1,064,982, 1,058,800 and U.S. Pat. No. 3,552,910. A blocked isocyanate is defined as being formally derived from the reaction of a blocking agent and an isocyanate. Such blocked isocyanates on heating may reform the original isocyanate or by heating with nucleophilic reagents may produce the same products as from the reaction of the same nucleophilic reagent with the parent isocyanates. As common examples of blocking groups, phenols, thiols, alcohols, amines β-diketones, oximes, β-ketoesters may be mentioned. The advantage of such blocked isocyanates is that they do not react with water at ambient temperatures but at higher temperatures they undergo chemical reactions exactly analogous to free isocyanates. However, it is well documented in the chemical literature that it is generally necessary to heat at 120°C or a temperature in excess of 120°C to effect the unblocking reactions of blocked isocyanates. Such heating at 120°C or above of keratinous materials, in particular wool, causes decomposition resulting in yellowing and reduction in fibre strength, and to such an extent as to preclude the industrial use of processes using such heating, except for very short periods such as in drying.

SUMMARY

It is the object of the present invention to provide a composition and process for the shrink-proofing of keratinous materials which in the extend and nature of the shrinkproofing so produced is at least equal to that provided by isocyanate and blocked isocyanate pre-polymers of the prior art, but does not have the associated disadvantages of such pre-polymers as outlined above. It was an unexpected finding of the present invention that poly-isocyanate - bisulphite addition products of structure (1), more specifically defined below, when applied to keratinous materials and cured by methods defined below, effectively shrinkproofed such keratinous materials.

In the prior art, for example, U.S. Pat. Nos. 2,746,988, 2,906,776 and German Pat. No. 922,711, the preparation and use of the bisulphite adducts of mono and diisocyanates have been disclosed and indeed the advantageous use of such products on textiles was also disclosed. However we have found a novel class of isocyanate - bisulphite adducts of particularly advantageous properties for the treatment of keratinous materials not possessed by isocyanate - bisulphite adducts of the prior art, and not obvious from the disclosures of the prior art.

According to the present invention there is provided a bisulphite addition product of a polyisocyanate and-/or polyisothiocyanate prepolymer, said addition product having on an average at least two isocyanate-bisulphite or isothiocyanate-bisulphite adduct groups pre molecule, having no free isocyanate or isothiocyanate groups, and being freely water-soluble, said prepolymer being derived from a polyisocyanate and/or polyisothiocyanate and a polyhydroxy compound.

The novel polyisocyanate - bisulphite adducts of the present invention are provided by the reaction of polyisocyanate pre-polymers with bisulphite salts by methods provided below, and described there in detail.

Such polyisocyanate - pre-polymers are provided by the reaction of a. polyisocyanates with
b. compounds containing at least two hydroxyl groups (such compounds will be referred to as polyols)

by any of the methods described in the prior art for the reaction of isocyanates with hydroxy compounds and well known to anyone skilled in the art of organic chemistry. Such reactions should be effected in a manner such that there is a sufficient excess of (a) to ensure reaction with all the hydroxylic groups in (b) so that at the completion of the reaction there is provided a product containing free isocyanate groups.

DESCRIPTION OF THE PREFERRED EMBODIMENTS

For the purposes of the present invention it is desirable that the polyisocyanate pre-polymers have a molecular weight in excess of 500, and preferably in the range 500 – 10,000 and most preferable between 1000 and 5000 and that the functionality is greater than two but most preferably between 2 and 4.

It has been found that the most suitable polyisocyanates for use in the present invention in (a) above, are those in which all the isocyanate groups are attached to aliphatic carbon atoms. Such aliphatic polyisocyanates are preferable to those containing both aliphatic and aromatic isocyanate groups and in turn these are preferable to those containing only aromatic isocyanates.

As aliphatic polyisocyanates suitable for (a) of the present invention, there may be mentioned those of structure $OCN-(CH_2)_n-NCO$ where $n$ is an integer from 2 to 16 but most preferably 4 or 6, i.e., tetramethylene diisocyanate and hexamethylene diisocyanate. Other suitable aliphatic isocyanates are 1 - isocyanato - 3 - isocyanatomethyl - 3,5,5 - trimethyl-cyclohexane (known commercially as isophorone diisocyanate), trimethylhexamethylene diisocyanate, the isomeric bis(isocyanatomethyl)-benzenes and toluenes, 1,4-bis(isocyanatomethyl)-cyclohexane, cyclohexane - 1,4 - diisocyanate, 4,4'-methylene bis (cyclohexylisocyanate), and the like.

Such aliphatic polyisocyanates may be used either alone or in a mixture with one or more of the other aliphatic polyisocyanates listed above.

As examples of aromatic isocyanates suitable for (a) of the present invention there may be mentioned 2,4 - toluene diisocyanate, 2,6 - toluene diisocyanate, commercial mixtures of 2,4 - and 2,6-toluene diisocyanate, 4,4'-diphenylmethane diisocyanate, dianisidiene diisocyanate, the isomeric benzene, xylene and napthalene diisocyanates. Such aromatic polyisocyanates may be used alone or in admixture with other aromatic polyisocyanates listed above or with the aliphatic polyisocyanates listed above.

A further provision of the present invention is that instead of polyisocyanates for (a) there may be used polyisothiocyanates, or compounds containing both isocyanate and isothiocyanate groups. However all such compounds are less preferable to the polyisocyanates. As an example of polyisothiocyanates there may be mentioned hexamethylene diisothiocyanate, tetramethylene diisothiocyanate, 2,4- and 2,6-toluene diisothiocyanate.

Polyols suitable for use as (b) in the present invention may have a backbone structure of the polyether, polyester, polythioether, mixed polyesterpolyether or mixed polyether polythio ether classes. However due to their superior stability to hydrolysis those containing ether linkages alone are superior to those containing ester linkages.

Suitable polyols for the present invention with a polyester backbone may be prepared from the condensation of polyhydroxy compounds with polybasic acids or their anhydrides or acid halides. Such polybasic acids may be wholly or partially replaced by hydroxy acids or lactones. Phosgene may be also incorporated into such condensations producing carbonate linkages in the backbone. Examples of polybasic acids suitable for use of the present invention are succinic, adipic, pimelic, phthalic, isophthalic, terephthalic and citric acids and the like. An example of a lactone suitable for use in caprolactone. As examples of suitable poly hydroxy compounds there may be mentioned ethylene glycol, propylene glycol, 1,4-butandiol, glycerol, 1,2,6-hexantriol, trimethylolpropane, trimethylolethane, pentaerythritol. In all such condensations it is to be understood that mixtures of all such polybasic acids or mixtures of all such polyhydroxy compounds may be used. As a particularly useful example of a polyester polyol there may be mentioned polycaprolactone and castor oil, and products from the modification of castor oil by further condensation reactions.

Polyols with a polyether backbone suitable for use in (b) of the present invention may be derived from the polymerisation by known methods under either acidic or basic catalysis of the following cyclic monomers containing oxygen; ethylene oxide, propylene oxide, the isomeric butylene oxides, oxacyclobutane, tetrahydrofuran and oxacyclohexane. Such monomers may be used alone or in admixture and the resultant polymerisations produce linear polyethers with a hydroxyl group at either end of the chain. Ethylene sulphide or propylene sulphide may wholly or partially replace the above oxygenated monomers resulting in products with thioether linkages in the backbone.

As particularly effective examples of such polyether compounds there may be mentioned polyethylene glycol, polypropylene glycol and polymerised tetrahydrofuran (polyoxytetramethylene) which possesses the repeating unit , most preferably in the molecular weight range 500 to 5000.

A further class of polyether polyols particularly advantageous for use as (b) in the present invention are those which can be formally considered to result from the polymerisation of the cyclic oxygen compounds such as ethylene oxide in the presence of an initiator with at least two hydroxyl groups. As examples of such initiators there are alcohols of the class $HO(CH_2)_nOH$ where n is an integer from 2 to 12 but most preferably 2 or 4, thiodiglycol, dithiodiglycol, glycerol, trimethylolethane, triethanolamine, 1,2,6-hexanethriol, pentaerythritol, sorbitol, glucose, resorcinol, phloroglucinol and the like. The use of this method leads to polyols of functionality greater than two whereas polymerisation of the cyclic oxygen compounds alone leads to difunctional compounds.

As particularly effective examples of such polyether polyols for the present invention there may be mentioned the products of condensation of glycerol or trimethylolpropane with ethylene oxide, propylene oxide or mixtures of ethylene and propylene oxide with molecular weights in the range 500 – 5000, but most preferably from propylene oxide with molecular weights from 1000 to 4000. A number of such products are readily available commercially as they are extensively used in the preparation of urethane foams and rubbers.

A particularly advantageous polyisocyanate prepolymer for the present invention is the proprietary product Synthappret LKF manufactured by Farbenfabriken Bayer AG., Leverkusen, Germany. This product has a structure very similar to that in structure (3)

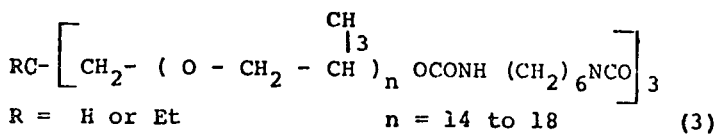

R = H or Et    n = 14 to 18    (3)

As other similarly advantageous polyisocyanate pre-polymers there may be mentioned Braxan LFA (Chem. Fabrik Pfersee, Augsberg, Germany) Stabifix C (Henkel et Cie, Dusseldorf) Lankrothane 1304 (Lankro Chemicals, England) and Arotap M-520 (Ashland Chemical Company, U.S.A.)

Polyisocyanate pre-polymers which are also useful for the purposes of the present invention but are less useful than those previously mentioned are products of the Adiprene series of E.I. du Pont de Nemours and Co., U.S.A. and of the Vibrathane series of U.S. Rubber Co.

The isocyanate - bisulphite addition products described in the prior art were prepared by treatment of the parent isocyanates with an aqueous solution of an alkali metal or ammonium bisulphite salt at ambient temperatures. However when such methods of the prior art were applied to the polyisocyanate pre-polymers of the present invention, particularly Synthappret LKF, little of the desired reaction was observed. Instead reaction of the isocyanates with water and subsequent crosslinking reactions were the main reactions observed. Furthermore attempts to provide more efficient mixing by high speed stirring or emulsification were unsuccessful, and indeed such methods even hastened the reaction with water. Also it was found that the products from such reactions with aqueous bisulphite were unsuitable for shrinkproofing keratinous materials. This difference between the present findings and those of the prior art appears due to the fact that the polyisocyanate pre-polymers of the present invention are insoluble in water whereas the prior art is concerned with simple isocyanates of low molecular weight which exhibit some (but not necessary complete) solubility in water. Thus in the present case the only reaction observed is that with water as it diffuses into the isocyanate phase, whilst with cases of the prior art there is a low concentration of isocyanate in the aqueous phase and the desired adduct is formed.

However it was an unexpected finding of the present invention that the bisulphite adducts of polyisocyanate pre-polymers could be formed in good yield if a water miscible organic solvent was added to form a homogeneous solution from the mixture of polyisocyanate prepolymers and aqueous bisulphite solution. It was a further unexpected finding that lower alcohols were particularly suited as such water miscible organic solvents. This finding is particularly unexpected as it is well known that alcohols react extremely readily with isocyanates, and indeed primary alcohols may even react with isocyanates faster than water does (e.g., J. H. Saunders and K. C. Frisch, vide supra). The fact that the bisulphite adduct is formed in preference to other products must indicate that bisulphite reacts with isocyanates faster than either water or alcohols do which is in accordance with the findings of S. Petersen, Liebigs Annalen, 562, 205, 1949.

Thus in accordance with a preferred aspect of the invention, a process for the preparation of a bisulphite addition product of a polyisocyanate and/or polyisothiocyanate, comprises reacting a polyisocyanate and/or polyisothiocyanate pre-polymer with a bisulphite salt, or a salt capable of conversion to a bisulphite salt, in the presence of water and a water miscible organic solvent, the pre-polymer being formed by the reaction of a polyisocyanate an and/or a polyisothiocyanate with a compound containing at least two hydroxyl groups.

More specifically, for the purposes of the present invention the bisulphite adducts of the polyisocyanate pre-polymers defined above can be prepared by mixing
  i. a polyisocyanate pre-polymer as defined above or a mixture of such polyisocyanate pre-polymers
  ii. an aqueous solution containing bisulphite anions, and
  iii. a water miscible organic solvent,
in such a manner that the resultant mixture is composed at least 80 percent by weight of a homogeneous phase which contains at least 80 percent by weight of (i) and at least 80 percent by weight of the bisulphite anions of (ii). It is most preferable that the mixture of (i), (ii) and (iii) is completely homogeneous, but if within the above limits the mixture will become homogeneous quite rapidly as the reaction proceeds, particularly if stirred vigorously. At the end of the reaction the mixture must be homogeneous. With mixtures of (i), (ii) and (iii) below the above limits of homogeneity, it is sometimes possible to obtain a homogeneous reaction product. However, under these circumstances much less than 100 percent of the isocyanate groups will have been converted to their bisulphite adducts, and side reactions, particularly those of the isocyanate groups with water, will occur extensively. The products from such reactions will often give a precipitate when diluted with water, whereas products of the most preferable methods are completely soluble in water.

The mixing of (i), (ii) and (iii) may be in any particular order desired, and as an alternative (ii) may be replaced by its solid component (iv) and water (v); (i), (iii), (iv) and (v) may also be mixed in any particular order desired. The solid (iv) may not contain bisulphite anions as such, and instead these may be formed only after dissolution in water. Such mixing and subsequent standing for reaction may be performed in the temperature range −20° to +50°C but most preferably between 0° and 20°. Preparations using pre-polymers with aliphatic isocyanate groups alone are most preferably carried out at room temperature whilst those using pre-polymers containing aromatic isocyanates are preferably performed between 0° and 5°.

Solutions most suitable for use as (ii) are those prepared by dissolving alkali metal, ammonium or substituted ammonium bisulphite or metabisulphite (sometimes known as pyrosulphite) salts or mixtures of such salts in water. Particularly advantageous examples of such salts are sodium bisulphite, sodium metabisulphite and the corresponding ammonium and potassium salts. Alternatively solutions suitable for use as (ii) may be prepared by dissolving sulphur dioxide in the form of a gas, liquid or aqueous solution in solutions of alkali metal or ammonium bicarbonates, carbonates or hydroxides or mixtures of such solutions. A further method to prepare such solutions for (ii) is to add mineral or organic acids to aqueous solutions of the salts of alkali metal or ammonium sulphite salts. Another method is to dissolve the solid adducts derived from aldehydes or ketones with alkali metal bisulphites in water, for example the adducts from acetone or acetaldehyde with sodium bisulphite.

Solutions for use as (ii) in the present invention have a pH preferably in the range 2 to 7 but most preferably between 3 and 5. It must be realised that in such aqueous solutions the bisulphite may be partly present in the form of metabisulphite ions, sulphite ions or dissolved sulphur dioxide. For the purposes of the present invention the total concentrations of bisulphite anions and related species should be sufficient to react all the isocyanate groups present and preferably there should be a slight excess. It has been found that ratios of total bisulphite to isocyanate of 1.01 to 1.5:1 are most preferable.

As examples of organic solvents suitable for use as (iii) for the purposes of the present invention there may be mentioned lower aliphatic alcohols, lower aliphatic aldehydes and ketones, dioxan, tetrahydrofuran, acetic acid, dimethyl formamide, dimethylacetamide, dimethyl sulphoxide and sulpholane. Such solvents may be used alone or in admixture. As particularly effective examples there may be mentioned ethanol, n-propanol, iso-propanol and dioxan.

The mixture components (i), (ii) and (iii) may contain inert substances which take no part in the bisulphite adduct formation. Examples of such inert substances in (ii) are sodium chloride, sodium sulphate and other water soluble alkali metal and ammonium salts. Sulphate salts may be commonly present due to the ready oxidation of bisulphite with air. As examples of such inert substances in (i) or (iii) there may be mentioned water immiscible organic solvents such as esters of lower aliphatic carboxylic acids, aromatic hydrocarbons, aliphatic hydrocarbons and chlorinated hydrocarbons. For example, Synthappret LKF is sold as an 80 percent solution in ethyl acetate and thus the resultant mixture contains small amounts of this substance.

The relative proportions of (i), (iii) and water most suitable for the purposes of the present invention will vary considerably depending on the exact nature of (i) and are best determined by experiment. With the isocyanate pre-polymers, Synthappret LKF, it was found that ethanol, n-propanol, isopropanol or dioxan were most suitable as (iii) and solutions of sodium or potassium metabisulphite in water as (ii), and using a 10 to 50 percent excess of metabisulphite salt. Most preferably 1 part of Synthappret was mixed with from 2.5 to 6 parts of mixture of ethanol and sodium metabisulphite with 10 – 50 percent excess, with ethanol and water in mixtures from 4 : 1 to 1 : 4 but most preferably 2 : 1. The adduct prepared in this manner from Synthappret LKF was particularly effective for shrink-proofing wool, and treating other keratinous materials. It must be realised that in such preparations some of the isocyanate groups in the pre-polymer may undergo reactions other than the formation of bisulphite adducts, in particular hydrolysis and reaction with alcohols if present, but it is the object of the present invention to provide methods whereby bisulphite adduct formation is the major reaction observed.

It must also be realised that in the processes of the prior art whereby keratinous materials were treated with substances containing isocyanate groups, such treatments may include bisulphite salts or substances giving rise to bisulphite salts, or such treatments may precede or succeed applications of bisulphite salts and thus it is conceivable that bisulphite adducts may be generated. But it is most likely from the nature of such treatments that such adducts will be only generated to a very limited extent. In addition keratinous materials contain groups particularly disulphides which are capable of ready reaction with bisulphite and thus the bisulphite would be rapidly removed. The advantages of the present invention are not gained unless the isocyanate groups are converted to a large extent to their bisulphite adducts, and this is best achieved by the methods provided in the present invention.

The most common keratinous fibre of commerce is wool, but such fibres can also be obtained from goats, llamas, alpacas and the like. Keratinous materials suitable for treatment with bisulphite adducts of polyisocyanates of the present invention may be in the form of loose fibre, card sliver, roving, yarn, fabric, felts or garments, but the keratinous material is most suitably in the form of fabrics. Such fabrics may be constructed by weaving, knitting or non-woven means or by a combination of such means. In addition such fabrics may be bonded by means of resins to other fabric or fabrics to form multilayer structures; the other fibres of such fabrics may be composed of non-keratinous fibres.

It is to be further appreciated that the keratinous materials can be a blend of fibres from various animal origins, for example wool and mohair blends or blends with other natural fibres, for example, wool and cotton blends, or a blend with one or more synthetic fibres, for example polyamide, polyester or acrylic blends with wool. Particular examples of blends for which the present invention is advantageous are wool-polyester blends, particularly those of compositions between 30 : 70 and 70 : 30.

In addition the keratinous material for the present invention may be from either dead or live animals or be of a reclaimed origin.

Furthermore the keratinous material for the present invention may be subject to a chemical pretreatment before the bisulphite adduct of the polyisocyanate is applied. As examples of such pretreatments there may be mentioned halogenation, reduction and oxidation. Examples of such halogenation methods are treatments with gaseous chlorine, chlorine in water or organic solvents, hypochlorite solutions, aqueous solutions of the N-chloro derivatives of amides (e.g., N, N - dichloroisocyanuric acid) and sulphuryl chloride in organic solvents. Examples of such oxidation methods are treatments with aqueous solutions of hydrogen peroxide, permonosulphuric acid or organic peroxides. Examples of such reduction methods are treatments with aqueous solutions of sodium bisulphite, sodium sulphite, other bisulphite salts or sodium dithionite.

However it is a particular advantage of the present invention that such chemical pre-treatments are unnecessary in contrast to many polymer shrinkproofing methods of the prior art where such pretreatments are obligatory, for example those based on polymers from the reaction of certain polyamides with epichlorhydrin (cf. C. A. Anderson et al., Textile Manufacturer Vol. 95 No. 1133 p. 184 1969). However, if the keratinous material has been subject to one of these chemical pre-treatments there is no deleterious effect produced with the resultant shrinkproofing obtained, using the methods of the present invention, and indeed there may even be a slight improvement.

A further finding was that compositions of the present invention prepared as described above were stable to storage at room temperature indefinitely, and that their solutions in water were similarly stable. An unexpected finding was the bisulphite adducts of polyisocyanates showed no reaction with aqueous hydrogen peroxide at room temperature indicating that the adducts were not in equilibrium with the parent isocyanate and bisulphite. Thus it was possible to remove excess bisulphite from the adduct preparations if necessary. This stability to storage in the presence of water is not possessed by polyisocyanates of the prior art. With polyisocyanates of the prior art to prevent premature curing special storage and handling conditions are necessary, particularly when emulsions of such polyisocyanates in water are used. These disadvantages are not possessed by the compositions of the present invention.

The amount of bisulphite adduct to be applied to keratinous material depends on the nature of the application and curing method, the chemical structure of the parent polyisocyanate, the level of shrinkproofing desired, and the nature of the keratinous material to be treated and is best determined by experiment. It has been found that for the purposes of the present invention keratinous materials are effectively shrinkproofed by addition of between 0.5 and 20 percent by weight of polyisocyanate - bisulphite adduct, and most preferably between 1 and 5 percent by weight. The adduct of sodium bisulphite to Synthaprett LKF was found to be most effective when applied to wool at concentrations from 2 to 4 percent by weight. Keratinous fabrics of a tight construction or which have been milled, will obviously require less polymer for shrinkproofing than those which prssess a looser construction (particularly knits) or those which have not been milled.

During such dilutions of the concentrated bisulphite adducts of polyisocyanates of the present invention various other water soluble or water insoluble agents may be added. As examples of such agents there may be mentioned those which modify flammability (i.e. fire retardant agents such as phosphorous derivatives, and halogenated polymers in the form of latices, e.g., polyvinylchloride), the handle (i.e., softening agents), the set and settability (i.e., setting agents) colour (dyes, bleaches or optical brightening agents) or the water repellancy of the material. Also agents to make the material resistant to attack by moths and beetles may be added, for example dieldrin and related chlorinated mothproofing agents. Such additions of such agents, to give a product with several improved properties, whereby the number of application, drying and or curing steps has been reduced, are well known to those skilled in the textile art.

Other agents which may be added during such dilutions are wetting agents or salts, acids or alkalis in order to adjust the pH of the solution. However it was an unexpected finding of the present invention that the adduct of sodium bisulphite to Synthappret LKF was an effective wetting agent for keratinous material and thus in applications if was unnecessary to add wetting agents as is normally done in the applications of aqueous solutions to keratinous materials in order to provide complete and rapid wetting out. This is a further advantage of the products of the present invention. Such wetting action no doubt results from the molecular structure of this adduct which contains long organic chains terminated by an anionic group.

Inpregnation of keratinous materials with aqueous solutions of the bisulphite adducts of polyisocyanates of the present invention may be by padding, dipping, spraying, brushing or the like, or by combinations of such methods. Keratinous fabrics are most effectively treated by padding.

As the bisulphite adducts of polyisocyanates of the present invention are anionic in nature they may be applied to keratinous materials by exhaustion from long liquor ratios in a manner analogous to the well known exhaustion of anionic dyes onto keratinous materials. Such exhaustion processes depend on the presence of cationic groups in the keratinous materials, and as the pH becomes more acid it becomes more favourable and conversely becomes more retarded as the pH becomes more alkaline. This ability to exhaust onto keratinous materials is a unique advantage over isocyanate and blocked isocyanate shrink-proofing compositions of the prior art which are invariably devoid of ionic groups and thus do not exhaust onto keratinous materials from long liquor ratios. This ability to exhaust allows the compositions of the present invention to be applied during a conventional long liquor dyeing or optical brightening processes whereby the bisulphi e adduct of the polyisocyanate is added before, at th same time or after the dyestuff or optical brightener is added. It is particularly advantageous that such adducts are anionic and that dyes used on wool are anionic so that pH changes to a more acid pH to complete the exhaustion of the dye also complete the exhaustion of the bisulphite adduct. Such co-application of dyes and shrink-proofing compositions has a number of advantages obvious to those skilled in the art including elimination of drying steps after aqueous treatments and the use existing textile mechinery without the requirement of special application machinery. Certain shrinkproofing resins for keratinous material derived from polyamides and epichlorohydrin (e.g., Hercosett 57, manufactured by Hercules Inc.,) are capable of exhausting onto keratinous materials but as these are cationic difficulties are encountered in simultaneous application of anionic dyes. Bleaching may also be performed during these operations, since as mentioned above the bisulphite adducts of polyisocyanates are stable in the presence of hydrogeen peroxide at room temperature.

The desired shrinkproofing effects using bisulphite adducts of polyisocyanates of the present invention are not fully obtainable until the treated material is subject to a curing operation and it is a further object of the present invention to provide such curing methods.

The curing on keratinous materials of the bisulphite adducts of polyisocyanates of the present invention may be effected by the following three methods used alone or in conjunction.

A. By heating in the absence of water at a temperature in excess of 100°C or more preferably in excess of 120°C.
B. By heating in the presence of water at a temperature in excess of 50°C.
C. By the addition of a crosslinking agent which contains two or more nucleophilic groups capable of reaction with isocyanates. Such nucleophilic groups may be drawn from one or more of the following classes; thiol, hydroxyl, primary amino and secondary amino groups.

Method (A) effects the known thermal unblocking of blocked isocyanates to free isocyanates which can then subsequently cure with water or by other methods of the prior art. However as keratinous materials become damaged on prolong heating at temperatures above 100°C, methods (B) and (C) are preferable to (A). To promote such thermal unblocking, compounds known to catalyse the unblocking of blocked isocyanates, such as tertiary amines and certain metal derivatives may also be added using method (A).

As examples of crosslinking agents suitable for use in method (C) for the purposes of the present invention there may be mentioned 1,2-diaminoethane, products of structure $NH_2(CH_2)_nNH_2$ where $n$ is an integer from 3 to 8, mono, di- and tri-ethanolamine, products of structure $NH_2(CH_2CH_2NH)_nCH_2Ch_2NH_2$ where $n$ is an integer from 1 to 5, polyethylene-imine, Quadrol (a product of the Wyandotte Company N,N,N'N'-tetrakis (2-hydroxyethyl)ethylenediamine), 4,4' - diamino diphenylmethane, MOCA (a product of the du Pont Company, with 2,2'-dichloro - 4,4'-diaminodiphenylmethane structure) and the like.

Examples of thiol containing compounds are 1,2-ethane dithiol, 2-mercaptoethaniol, 2-mercaptoethylamine, thiol terminated polymers manufactured by the Thiokol Company of U.S.A., designated LP-2, LP-3, LP-8, LP-33, and the thiol terminated polymer designated Oligan 500, manufactured by CIBA-Geigy of Switzerland which is derived from esterification of a polypropylene oxide triol with thioglycollic acid and related products as described in United Kingdom applications Nos. 38716/70, 38499/70. Examples of polyhydroxy compounds suitable for use in (C) are all the polyols mentioned above suitable for use as polyols in the formation of the polyisocyanate prepolymers. Compounds with amino and thiol groups have been found to be more effective than those with only hydroxyl groups, and Oligan 500 MOCA, diethylene triamine, triethylene tetraamine and tetraethylene pentamine were found to be particularly advantageous for use as crosslinking agents in curing method C of the present invention.

It is to be appreciated that after the applications of the aqueous solutions of the compositions of the present invention to the keratinous material it is necessary for the purposes of subsequent textile operations to remove the water so applied by a drying operation. Hence the curing reaction may occur prior to, at the same time or subsequent to this drying operation. It is particularly advantageous if curing does indeed occur during the drying operation and it was found that the sodium bisulphite adduct of Synthappret LKF would cure alone or in presence of crosslinking agents such as MOCA Oligan 500 or diethylenetriamine under the conditions normally encountered in industrial textile drying machines, and thus it was unnecessary to subject the material to a separate curing treatment.

As might be expected, it was found that curing by methods (A), (B) and (C) was influenced by the initial pH of the aqueous solution of the composition of the present invention, and that this pH was most preferably in the range 2 – 10 but most preferably in the range of 3 – 8. Above pH 8 even through the keratinous material is still shrinkproofed effectively, alkaline damage to the keratinous material occurs excessively, whilst with very acid condition the shrinkproofing effect is destroyed.

As unexpected finding of the present invention was that the shrinkproofing produced by bisulphite adducts of polyisocyanates, cured under certain conditions, was more stable to subsequent thermal treatments than was the shrinkproofing produced by the same polyisocyanates applied from solvents and steam cured. For example, Synthappret LKF when applied to woollen fabric and steam cured for 30 mins., is effectively shrinkproofed but this shrinkproofing is lost by heating at 120°C for 30 mins. The sodium bisulphite adduct of Synthappret LKF showed similar behaviour if cured by a short period of steaming, however, if it was cured by use of Oligan 500, or MOCA as crosslinking agents or if the pH was adjusted to a value above 7 by addition of sodium bicarbonate and cured by steaming the resultant shrinkproofing was stable to heating at 120°C for 30 mins.

In addition to shrinkproofing, the compositions of the present invention have been found to impart other desirable properties to keratinous materials, such as improving subsequent dyeability, impart resistance to pilling and lustering in wear, minimumise wrinkling and with knitted structures to impart sufficient dimensional stabilisation to allow mechanical treatments, such as encountered in subsequent finishing operations particularly when in a wet state, not previously allowable. Other desirable properties imparted will become apparent from the following discussion.

In certain applications, shrinkproofing alone is not sufficient, and it is also desirable that after washing and drying as well as not shrinking the keratinous material should return to its original shape and in particular creases, pleats and flat areas should be retained; i.e., the material should also be permanently set. This combination of shrinkproofing and permanent set is commonly known as permanent press, and is highly desirable in keratinous materials. It was found that keratinous materials which had been shrinkproofed by compositions of the present invention could readily be set by methods of the prior art, and in particular by permanent setting methods of the prior art and thus permanent press could be achieved. In addition it was found that the compositions of the present invention could per se stabilise set and in certain circumstances this stabilisation has been found to be permanent and thus permanent press could be obtained by the compositions of the present invention per se.

The ability of compositions of the present invention to stabilise set is due to the film of cured polymer constraining the keratinous material to the original shape and is analogous to setting by polyisocyanate compositions of the prior art, however there is an additional factor not possessed by polyisocyanates of the prior art, namely that the curing reaction itself releases bisulphite ions which are well known to be effective setting agents for keratinous materials. In addition compositions of the present invention would invariably contain small amounts of free bisulphite (unless special precautions had been taken to remove it) from the initial method of preparation where the use of a slight excess of bisulphite is advantageous. For example with the sodium bisulphite adduct of Synthappret LKF, this would be used on wool at a level of about 3 percent and thus the curing of this amount of adduct would generate 0.3 percent sodium bisulphite. There would be an additional 0.1 to 0.2 percent free bisulphite present in the initial adduct preparation if the methods of preparation outlined below were used. Thus the wool receives an amount of sodium bisulphite known to be effective in setting wool.

Keratinous materials treated with compositions of the present invention and subsequently cured can readily be given temporary set by any of the methods of the prior art, such as steaming or steaming with reducing agents. The presence of cured polymer is no hindrance to introduction of set.

To produce permanent press materials from keratinous materials shrinkproofed by the methods of the present invention, any of the methods in the prior art for achieving permanent set can be used (for a discussion of such methods cf. I.B. Angliss et al., Applied Polymer Symposia 18, 1027, 1971).

Such permanent setting methods involve first imparting a temporary set by steaming for a short period with an agent capable of reducing disulphide bonds, preferably at an alkaline pH. As examples of solutions suitable for use to impart such temporary set there may be mentioned sodium bisulphite solution, monoethanolamine bisulphite solution and sodium thioglycollate solution.

The permanent set condition is then achieved by subjecting after temporary set has been imparted, to the following known means, for example, 1. Steaming with saturated steam for 2 – 3 hours for example as in Australian Application No. 10987/70.
2. Introducing chemical crosslinks within the fibre with polyfunctional reagents, for example as in Australian Patent Application No. 46,845/68.
3. Removal of free thiol groups by blocking with monofunctional agents, by oxidation, or by complexing with divalent metal ions.
4. Application and curing of a reactive polymer on the fibre surface, for example as in Australian Patent Application No. 23382/70.
5. Various combinations of the above four methods, and other known methods.

Method (1) was found to be particularly advantageous.

A further application of compositions of the present invention is in "delayed cure" setting processes, i.e., the material is treated, but not cured, at the fabric stage and then after making up of the garments and forming of these into the desired shape, curing is then effected which stabilises the material in the desired shape. Such delayed cure can be achieved because the bisulphite adducts of the present invention are stable at room temperature and are unaffected by the presence of moisture. To accomplish such a delayed cure process it is essential that no curing occurs in the drying operation which inevitably follows applications of aqueous solutions of compositions of the present invention to keratinous materials. This can be achieved if the drying is carried out below 80°C, if no crosslinking agents such as in method (C) above are present and if the pH of the initially applied aqueous bisulphite adduct solution is in the range 2 – 5 preferably about pH3. These conditions minimumise the rate of the curing reaction and allow delayed cure to be achieved. Delayed cure is not possible with polyisocyanates of the prior art as these cure readily at room temperature with mositure, and thus is a further advantage of the present invention.

A further unexpected finding of the present invention was that the compositions of the present invention on curing could bind small water insoluble particles, in particular coloured pigments, to the keratinous materials. Thus it is possible to simultaneously shrinkproof and dye or print. It was found that such pigment dyeings exhibited high fastness to washing, rubbing and exposure to light. Methods for pigment dyeing or printing of keratinous materials of the prior art are either possessed with poor fastness particularly to rubbing, or require complex application methods, such as in Australian Application No. 0318/70, where the keratinous material is first chlorinated, treated with a mixture of pigment and Hercosett 57 resin, and finally treated with an acrylic resin. The method of the present invention requires only one application step. Pigment dyeings by the method of the present invention, like those produced in Application No. 0318/70, produce pastel shades of exceptionally high fastness to exposure to light. In such pigment dyeings and printings it is usual to add special agents and to conduct the drying in such a manner so as to prevent pigment migration leading to uneven pigment distribution before the resin has cured, and such methods are well known to those skilled in the art. As examples of such agents there may be mentioned thickening agents of the alginate starch and carboxymethylcellulose classes. The majority of pigment preparations used in the textile industry contain anionic dispersing agents, particularly those of phenol and naphthalene sulphonic acid formaldehyde condensate classes. Such anionic agents can interact with cationic resins such as Hercossett 57 used in the method of application No. 0318/70 causing pigment flocculation and other difficulties. As the compositions of the present invention are anionic in nature such interactions and resultant disadvantages do not occur.

It is to be noted that many modifications can be made to the method described above and that all such modifications are considered to be well in the spirit and scope of this invention. The following examples are provided to illustrate the present invention but are not to be construed as limiting the invention in any way. Parts given below are by weight unless otherwise stated and temperatures in degrees centigrade.

EXAMPLES

General Method

The fabric used, unless otherwise stated, was a scoured, plain weave worsted fabric (13 ends, 12 picks, 2/30 tex yarn with both single and twofold twists of 3.9 turns/cm) made from Merino 64's wool. Squares of this fabric approx. 15 × 15 cm were padded to 80 percent pickup with aqueous solutions to give the desired add on then cured.

Washing tests were performed in a 50l cubex with 12.5l of wash liquor and 1 kg of goods comprised of about 20 samples of the fabric and cotton weighting squares to make up the remainder of the weight.

The wash liquor was a solution at 40°C of 0.2g/l anhydrous disodium hydrogen phosphate 0.1g/l anhydrous monosodium dihydrogen phosphate, & 0.05g/l alkanate O (ICI). The samples were washed for a total of 2 hours, placing a fresh change of wash liquor in each 30 minutes. The samples were measured 3 times each in the warp and weft directions after relaxing in a solution containing 0.5 percent sodium bicarbonate 0.5 percent LUX and the area shrinkage calculated. Untreated samples shrank about 70 percent in 2 hours.

EXAMPLE I

Synthappret LKF was converted to its bisulphite adduct by the following methods:

Preparation 1: Sodium metabisulphite (11.7g) was dissolved in water (80 ml) and ethanol (160 ml) was added. This solution was immediately added to Synthappret LKF (115g) with stirring. After 5 minutes the solution cleared, and stirring at room temperature was continued for 2 hours. The resultant solution could be infinitely diluted with water to give a clear solution and was stable indefinitely at room temperature.

Preparation 2: As preparation 1 but methanol was used instead of ethanol.

Preparation 3: As preparation 1 but n-propanol was used instead of ethanol.

Preparation 4: As preparation 1 but iso-propanol was used instead of ethanol.

Preparation 5: As preparation 1 but 2-methoxyethanol was used instead of ethanol.

Preparation 6: As preparation 1 but 2-ethoxyethanol was used instead of ethanol.

Preparation 7: As preparation 1 but potassium metabisulphite (13.6g) was used instead of sodium metabisulphite.

Preparation 8: As preparation 1 but sodium bisulphite (13g) was used instead of sodium metabisulphite.

Preparation 9: As preparation 1 but 40% ammonium bisulphite solution (29 ml) was used instead of sodium metabisulphite.

Preparation 10: As preparation 1 but the metabisulphite was dissolved in the water and the Synthappret LKF dissolved in the ethanol and the two solutions were then mixed.

Preparation 11: Sodium metabisulphite (5.7 g) was dissolved in water (80 ml) and ethanol (110 ml) was added. This solution was immediately added to Synthappret LKF (56 g) with stirring. After 3 hours a clear solution which could be infinitely diluted with water to give a clear solution was obtained.

Preparation 12: As preparation 11 but water (50 ml) and ethanol (140 ml) was used instead.

Preparation 13: Sodium metabisulphite (25 g) was dissolved in water (200 ml) and this solution was added with stirring to a solution of Synthappret LKF (230 g) dissolved in dioxan (1 l). This solution was stirred overnight.

Preparation 14: As preparation 1 but sodium metabisulphite (11.3 g) was used.

Preparation 15: As preparation 1 but sodium metabisulphite (12.5 g) was used.

Preparation 16: Sodium bisulphite (110 g) was dissolved in water (1 l) and added with stirring to a solution of Synthappret LKF (1 kg) in ethanol (2 l) which had just been prepared. A clear solution resulted. Preparations 1 to 16 inclusive were all performed at room temperature.

Samples of all the above preparations were diluted with water to give solutions of 4 percent solids content. These samples were padded onto samples of the above-mentioned wool fabric with a mangle set to give 70 percent pickup. Curing was then effected by either of the following methods:

a. heating in an oven at 100° for 30 minutes
b. placing in an oven which was raised to 100° over 30 minutes, and then live steam was injected in for 5 minutes
c. steaming in a Hoffman Press for 1 minute after a preliminary drying at 70° for 30 minutes.
d. steaming for 2 minutes in a Hoffmann Press without pre-drying
e. drying for 30 minutes at 70°C and then steaming for 2 minutes with a steam iron
f. drying in a tenter at 130° for 5 minutes and then blowing (decatizing) with steam for 1 minute. Methods (a) to (e) inclusive are examples of laboratory curing methods, whilst (f) is an inductrial scale curing method.

Samples were then given a simulated dry cleaning by standing at room temperature for 30 minutes in perchlorethylene (liquor to goods ratio 20 : 1) with occasional shaking.

The samples were then washed for two hours in the manner described above, in all cases area shrinkages of less than 4 percent were observed.

EXAMPLE II

Preparation No. 1 (15 ml) was diluted with water to 100 ml. To this solution were added various adjuncts which are listed in table I column 1. The amount of such adjunct added was calculated so as to give the percent add on by weight given in column 2 when the solution was padded on at 80 percent pickup. This gives a polymer add on of approximately 3 percent.

15 × 15 cm samples were padded with the various solutions and cured using the methods listed under Example I. The curing method is given in column 3. After curing the samples were washed for 2 hours, as described above, and the percent area shrinkage is given in column 4. Negative shrinkages indicate an expansion in area Table I

| Column 1 Adjunct | 2 % Add on | 3 Curing Method | 4 % Area shrinkage |
| --- | --- | --- | --- |
| 1 None | — | g[a] | 71 |
| 2 None | — | c | 1 |

Table I – Continued

| Column 1 Adjunct | 2 % Add on | 3 Curing Method | 4 % Area shrinkage |
| --- | --- | --- | --- |
| 3 HCl to give pH2 | — | c | 34 |
| 4 NaHCO₃ to give pH6 | | c | −1 |
| 5 Na₂CO₃ to give pH8 | | c | −1 |
| 6 Na₂CO₃ to give pH10 | | c | −1 |
| 7 NH₃ to give pH8 | — | c | −1 |
| 8 Oligan 500 [1,2] | 1 | a | −1 |
| 9 Sodium nitrite | 1 | c | 45 |
| 10 Formaldehyde | 1 | c | 32 |
| 11 Triethylamine | 0.5 | c | 27 |
| 12 Diethylenetriamine | 0.1 | a | −2 |
| 13 do. | | g | 44 |
| 14 MOCA | 0.36 | a | −2 |
| 15 do. | | g | −2 |
| 16 4,4'-methylenedianiline | 0.24 | d | −2 |
| 17 do. | | g | −2 |

These results demonstrate the optimum pH range for curing (nos. 3 to 7), the use of polythiol crosslinking agents (8), the use of polyamine crosslinking agents, and the improved thermal stability with such agents (12 – 17). Also certain agents (e.g. 9, 10) will destroy the shrinkproofing effect.

Notes
1 A product of CIBA-Geigy AG.
2 Emulsified with the aid of a non-ionic detergent
3 g = cured at 120° for 30 minutes

EXAMPLE III

15 × 15 cm square samples of the above wool fabric were padded with aqueous solutions of preparation 1 to give 3 percent by weight add on of polymer with a pickup of 70 percent.

The samples were dried by the following methods:
a. Air drying at room temperature for one day.
b. Tumble drying for 15 minutes in a tumble dryer with air temperature of 50°C.
c. Heating in an oven at 50°C for 30 minutes.

The samples were folded in half and steamed for 1 minute with a steam iron or in a Hoffmann press. The samples were then washed for 2 hours as above. In all cases area shrinkage of less than 4 percent was observed and a sharp crease was retained in the sample.

Similar results were also obtained if a period from one week to six months was allowed to elapse between the drying and the steaming provided that the sample was kept below 30°C during the elapsed period.

EXAMPLE IV

A solution was prepared from Preparation 1 (15 ml), water (85 ml) and the pigment paste Heliofast Blue B (0.125 g) (Bayer) (C.I. Pigment Blue IS) This was padded onto wool samples at 80 percent pickup, and then the samples were steamed without predrying for 2 minutes. Samples were washed as above for 2 hours and less than 4 percent area shrinkage was observed. Using the methods in "Standard Methods for the Determination of Colour Fastness of Textiles", 3rd Edition, Society of Dyers and Colourists, Bradford 1962, the following fastness ratings were obtained:

| | |
| --- | --- |
| light fastness | 6 – 7 |
| crocking | 4 |
| wash fastness (ISO 3) | 4 |

Similarly with the pigment Hostaperm Red E3B Colanyl (Hoechst) (0.06 g), similar fastness ratings were obtained and an area shrinkage of less than 4 percent was observed.

EXAMPLE V

Polyisocyanate pre-polymers were prepared in the following manner

Preparation 17: A polyether triol (3000 g) derived from propylene oxide and trimethylol propane with a molecular weight of 3000 ± 200 and a hydroxyl number of 56 ± 3 and hexamethylene diisocyanate (HMDI) (535 g) was heated for 2 hours at 110°C and then at 130°– 140° for ½ hour. This produced a prepolymer of isocyanate content 3.9 percent.

Preparation 18: As preparation 17 but a triol MW 3000 ± 200 derived from glycerol and propylene oxide was used.

Preparation 19: As preparation 17 but a triol MW 4000 ± 200 was used.

Preparation 20: As preparation 17 but a triol M was used.

Preparation 21: As preparation 17 but a polyoxypropylene triol of MW about 3000 (manufactured under the trade name Voronol CP 3000 by Dow Chemical Company) (3000 g) was used in place of the triol.

Preparation 22: As preparation 17 but a polyoxypropylene triol of MW about 3500 (Voronol CP 3500 - Dow Chemical Company) was used in place of the triol.

Preparation 23: As preparation 17 but a polyoxypropylene triol of MW about 3000 (Niax 16 – 46 - Union Carbide Corporation) was used in place of the iol.

Preparation 24: As preparation 17 but tetrame' ylene diisocyanate was used instead of HMDI.

Preparation 25: As preparation 17 but Desmodur N (Farbenfabriken Bayer) N,N'-Bis(6-isocyanatohexyl) urea was used instead of HMDI.

Preparation 26: As preparation 17 but isophorone diisocyanate (Veba-Chemie AG.) was used instead of HMDI.

Preparation 27: As preparation 17 but 2,2,4-trimethylhexamethylene diisocyanate (Veba-Chemie AG.) was used instead of HMDI.

Preparation 28: As preparation 17 but hydrogenated 2,4 -toluene diisocyanate (1-methyl cyclohexane 2,4 diisocyanate) was used instead of HMDI.

Preparation 29: As preparation 18 but hydrogenated MDI (Bis(4 - isocyanatocyclohexyl)methane) was used instead of HMDI. The polyisocyanate pre-polymers were converted to their bisulphite adducts by the following general methods.

The polyisocyanate (1 part) was treated with a solution of sodium metabisulphite (1.1 to 1.5 equivalents per isocyanate group) in water (2 parts) and ethanol (4 parts) at room temperature.

The adducts thus prepared were diluted with water and padded onto wool to give an add on of 3 percent by weight of polymer. The samples were cured by steaming for 2 minutes and then washed for 2 hours. In all cases area shrinkage of less than 4 percent was observed.

We claim:

1. A bisulphite addition product of a polyisocyanate and/or polyisothiocyanate prepolymer, said addition product having on an average at least two isocyanate-bisulphite or isothiocyanate-bisulphite adduct groups per molecule, having no free isocyanate or isothiocyanate groups, and being freely water-soluble; said prepolymer being the water-insoluble reaction product of a polyisocyanate and/or polyisothiocyanate and a polyhydroxy compound.

2. An addition product as claimed in claim 1, wherein the polyisocyanate or polyisothiocyanate prepolymer has a molecular weight in the range 500 – 10,000 and a functionality greater than 2.

3. An addition product as claimed in claim 2, wherein the molecular weight of the prepolymer is in the range 1000 to 5000 and the functionality is from 2 to 4.

4. An addition product as claimed in claim 1, wherein all of the isocyanate groups in the polyisocyanate prepolymer are attached to aliphatic carbon atoms.

5. An addition product as claimed in claim 1, wherein the polyisocyanate has the structure
   $OCN-(CH_2)_n-NCO$
   wherein $n$ is an integer from 2 to 16.

6. An addition product as claimed in claim 5, wherein $n$ is from 4 to 6.

7. An addition product as claimed in claim 1, wherein the polyhydroxy compound has a backbone structure containing ether linkages only.

8. An addition product as claimed in claim 7, wherein some or all of said ether linkages are replaced by thioether linkages.

9. An addition product as claimed in claim 1, wherein the polyhydroxy compound is a polyether polyol having a molecular weight in the range 500 to 5000.

10. An addition product as claimed in claim 9, wherein the polyether polyol is a condensation product of glycerol or trimethylolpropane with propylene oxide and has a molecular weight in the range 1000 to 4000.

11. A bisulphite addition product of a polyisocyanate prepolymer of the formula

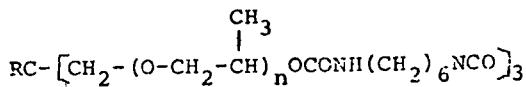

wherein R is hydrogen or an ethyl group and $n$ is from 14 to 18, said addition product having no free isocyanate groups and being freely water-soluble.

12. A process for the preparation of a bisulphite addition product of a polyisocyanate and/or polyisothiocyanate prepolymer, comprising reacting a water-insoluble polyisocyanate and/or polyisothiocyanate prepolymer with a bisulphite salt, or a salt capable of conversion to a bisulphite salt, in the presence of water and a water miscible organic solvent, the prepolymer being formed by the reaction of a polyisocyanate and/or a polyisothiocyanate with a compound containing at least two hydroxyl groups.

13. A process as claimed in claim 12, wherein the addition product is prepared by mixing
   i. the polyisocyanate and/or polyisothiocyanate prepolymer,
   ii. an aqueous solution containing bisulphite anions, and
   iii. a water miscible organic solvent, in such a manner that at least 80 percent by weight of the resultant mixture is composed of a homogeneous phase which contains at least 80 percent of the prepolymer and at least 80 percent by weight of the bisulphite anions.

* * * * *